July 3, 1951
A. G. FELDMAN
2,559,040
VEHICLE WHEEL WITH IMPROVED HUB CAP MOUNTING
Filed June 7, 1950
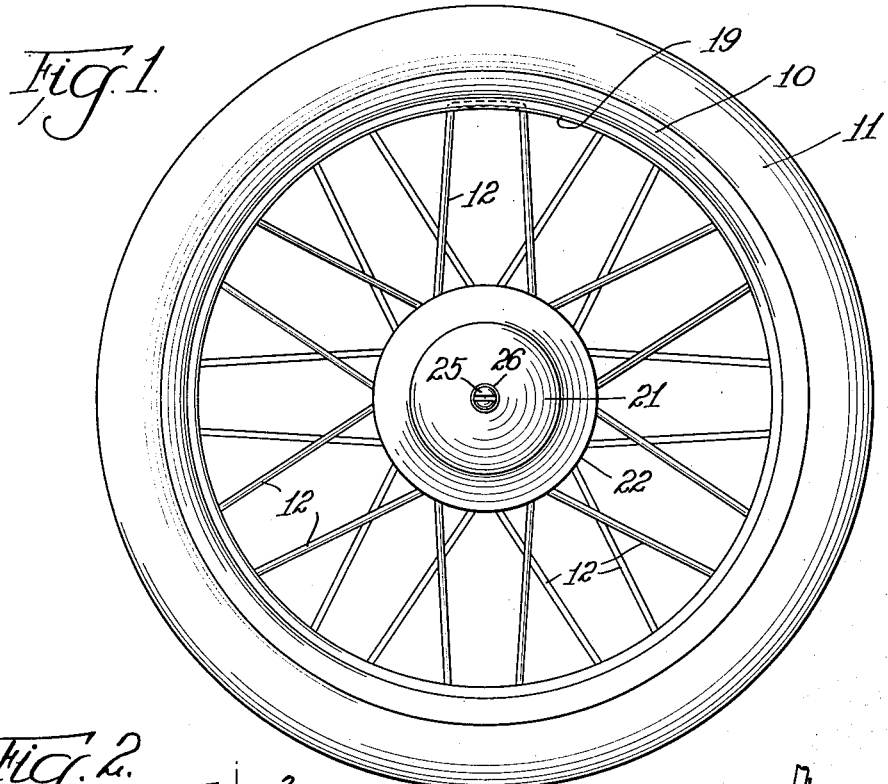
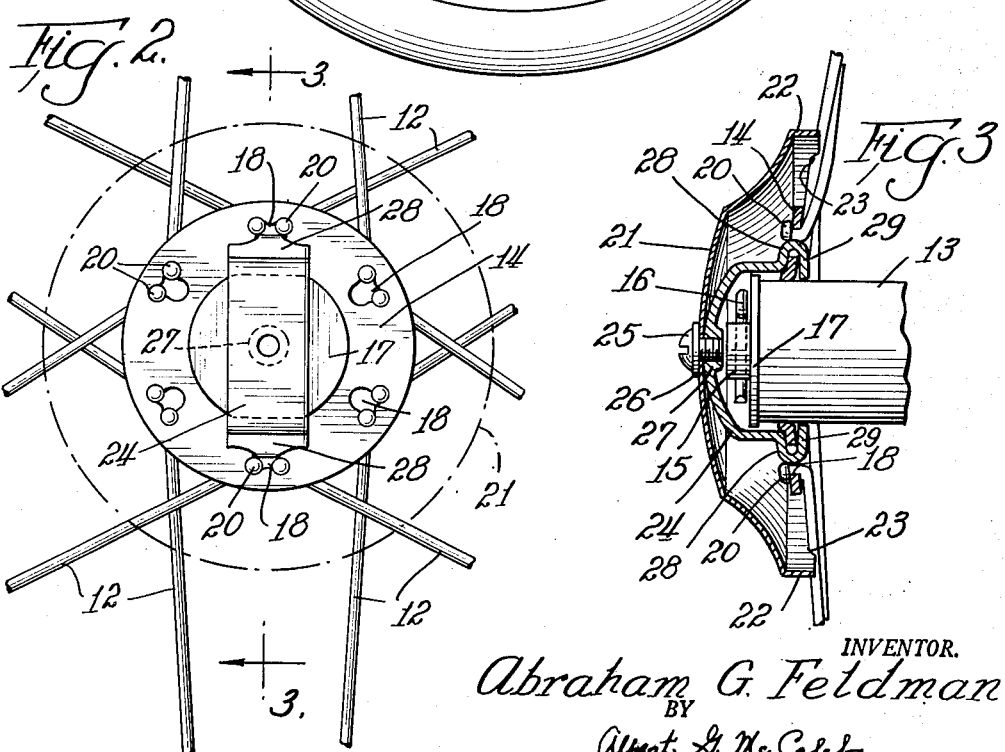
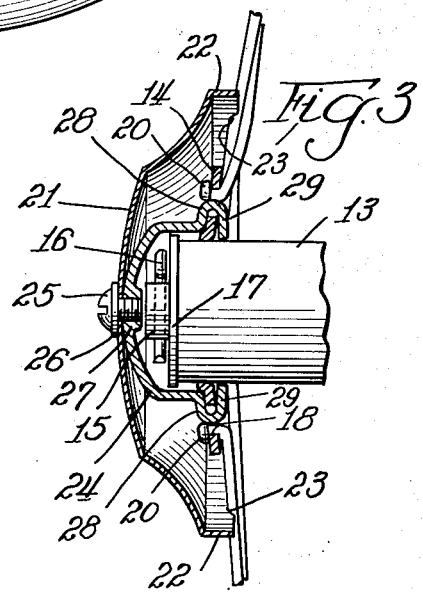
INVENTOR.
Abraham G. Feldman
BY Albert G. McCaleb
Atty.

Patented July 3, 1951

2,559,040

UNITED STATES PATENT OFFICE 2,559,040

VEHICLE WHEEL WITH IMPROVED HUB CAP MOUNTING

Abraham G. Feldman, Chicago, Ill., assignor to Storkline Furniture Corporation, Chicago, Ill., a corporation of Illinois Application June 7, 1950, Serial No. 166,711

5 Claims. (Cl. 301—108)

My invention contemplates and provides, for association with baby carriages or like vehicles, a wheel with an improved hub cap mounting.

An important object of the present invention is to take advantage of certain wire spokes of a wheel and certain spoke anchorage apertures in a spoke flange of the wheel hub in providing a simple, effective and dependable hub cap mounting comprising but a single screw.

A salient feature of the hub cap mounting of the present invention is a novel one-piece supporting yoke having end portions inter-engaged with diametrically opposite portions of a hub spoke flange and an intermediate portion that extends around an adjacent end of the wheel axle and is screw-secured to and centrally of the hub cap.

These and other objects, features and advantages of my invention will more fully appear from the following detailed description of a presently preferred embodiment thereof wherein reference is made to the accompanying sheet of drawings in which, Fig. 1 is a side elevational view of a wheel embodying my present invention;

Fig. 2 is an enlarged fragmentary view, comparable to Fig. 1, of the central portion of the wheel with the hub cap removed; and Fig. 3 is a fragmentary axial sectional view that may be regarded as taken in the plane of the line 3—3 of Fig. 2 and looking in the direction indicated by the arrows.

Similar characters of reference refer to similar parts throughout the several views.

A wheel embodying the improvements of my present invention desirably comprises a one-piece metal rim 10 carrying the usual tire 11, wire spokes 12, and a metal hub 13 having pressed tightly upon its end portions a pair of similar and symmetrically disposed spoke flange members, one of which is clearly shown at 14 in Figs. 2 and 3. An axle for the hub 13 is depicted at 15. Numeral 16 denotes a cotter-key which prevents escape of the hub from the adjacent free end of the axle and reference numeral 17 denotes a washer which desirably encircles the axle and lies between the cotter-key and the proximate end of the hub.

Each spoke flange 14 is provided adjacent its periphery with a plurality of equidistantly spaced spoke anchorage apertures 18 which, desirably, are roughly clover-shaped. The rim 10 desirably is provided at its inner periphery with an annular bead 19 defining a continuous channel facing the wheel tire. Such bead is provided with a plurality of equidistantly spaced through apertures for the accommodation of outer ends of the wire spokes 12. The spokes 12 are formed in pairs. The spokes of each pair are provided by a single piece of wire which has an off-set upset end 20 anchored in one of the spoke flange apertures 18, extends from such anchorage to and through one of the spoke accommodating apertures in the rim bead 19, thence along and internally of the channel of such rim bead, thence outwardly through another spoke accommodating aperture of the rim bead, and thence back to the spoke flange from whence it started, there to be provided with another off-set up-set end 20 having anchorage in a spoke anchorage aperture 18 once removed from the similar aperture in which the other end of such wire has its anchorage. At 21 is depicted a spun or pressed and substantially dished sheet metal hub cap provided with a peripheral flange 22 presented toward the spokes 12. Such flange 22 is provided with a plurality of spaced apart notches 23. Each spoke 12 associated with each spoke flange 14 crosses in contiguity another spoke, with which it is not integral, associated with the same spoke flange. The nearer one of each crossing pair of spokes lying adjacent the hub flange 22 is received by one of the notches 23 of that flange.

At 24 is depicted a one-piece metal supporting yoke which cooperates with a single screw effectively to retain the hub cap 21 in appropriate relation to the wheel hub 13 and in embracing relationship to those spokes 12 with which co-operate the flange notches 23 as aforementioned. The single screw to which I have alluded is depicted at 25. It extends freely through a central aperture in the hub cap 21 to threadedly engage the yoke 24 and suitably has a cooperating lockwasher 26.

Yoke 24 consists of a piece of strap metal given a conformation that is generally U-shaped when viewed from the side (see Fig. 3), with the web of the U concavo-convex; the concave surface of the yoke web being presented to the wheel axle 15 and hub 13, and its convex surface being presented to the inner surface of the hub cap 21. The central portion of the yoke web is suitably bossed and threaded as generally indicated at 27 for cooperation with screw 25.

Near each of its extremities, the yoke 24 is provided with a clamping shoulder 28 lying contiguous the associated spoke flange 14. Projecting from each shoulder 28 intermediate its ends, is a tang 29 of relatively narrow width. Each tang 29 extends through one of the the spoke anchorage apertures 18 of the spoke flange and has its free extremity turned tightly against the inner face of such spoke flange, tightly to squeeze the spoke flange between the tang and the opposed clamping shoulder 28 of which the tang is an extension. The spoke anchorage aperture through which each of the tangs 29 projects is diametrically opposite the corresponding aperture through which the other tang projects.

It will thus be understood that I have provided a vehicle wheel structure characterized by a simple, effective and dependable hub cap mounting which comprises as a salient feature a one-piece yoke which holds itself to a wheel hub spoke flange without the aid of screws or the like and which, with the aid of a single screw centrally engaging an appropriately dished hub cap, holds that hub cap so related to certain of the wheel spokes that it is definitely stabilized, and held against rotation relative to the wheel, by those spokes.

What I claim as new and desire to secure by Letters Patent of the United States is:

1. In a vehicle wheel, a rim, a hub, a spoke flange carried by the hub, spokes extending between the rim and the spoke flange, said spokes being constituted by wires having their extremities anchored in equidistantly spaced apertures formed in the spoke flange, a strap metal supporting yoke that is generally U-shaped and provided near each of its extremities with a spoke flange engaging shoulder, each extremity of said yoke being in the form of a relatively narrow tang projecting from one of said shoulders, each of said tangs extending through one of the spoke anchorage apertures of the spoke flange and being turned against the adjacent face of the spoke flange to clamp the spoke flange between such tang and the yoke shoulder from which it projects, the spoke anchorage apertures through which said tangs project being diametrically opposite each other, a dished hub cap embracing said yoke and the adjacent end of the wheel hub, said cap having its central portion secured to the yoke, intermediate the ends of the yoke, by a single screw, and a peripheral flange which is presented to the wheel spokes and which is provided with spaced apart notches embracing some of said spokes.

2. In combination with a wheel hub having a spoke flange from which extend, to a wheel rim, tensioned spokes formed by wires having extremities anchored in spaced apart apertures formed in said spoke flange, a metal yoke that is generally U-shaped in side elevation and which is provided with extremities which extend through diametrically opposite spoke anchorage apertures and are off-set behind the spoke flange to retain the yoke upon the spoke flange, and a suitably dished hub cap having its central portion screw-secured to the yoke substantially midway between the ends of the yoke.

3. A combination of wheel elements according to claim 2 wherein the yoke is formed of strap metal and is provided near each of its ends with a shoulder for engagement with the outer surface of the spoke flange, each yoke extremity being in the form of a narrow tang extending from one of said shoulders.

4. A combination of wheel elements according to claim 2 wherein the dished hub cap is provided with a peripheral flange having spaced apart notches receiving some of the wheel spokes.

5. A combination of wheel elements according to claim 2 wherein the yoke is formed of strap metal and is provided near each of its ends with a shoulder for engagement with the outer surface of the spoke flange, each yoke extremity being in the form of a narrow tang extending from one of said shoulders, and wherein the dished hub cap is provided with a peripheral flange having spaced apart notches receiving some of the wheel spokes.

ABRAHAM G. FELDMAN.

REFERENCES CITED

The following references are of record in the file of this patent:

UNITED STATES PATENTS

| Number | Name | Date |
|---|---|---|
| 1,522,548 | Schibrowski | Jan. 13, 1925 |
| 1,860,264 | Owen et al. | May 24, 1932 |

FOREIGN PATENTS

| Number | Country | Date |
|---|---|---|
| 236,902 | Switzerland | July 16, 1945 |